United States Patent
Zhao (10) Patent No.: US 12,308,741 B2
(45) Date of Patent: May 20, 2025

(54) BUCK CIRCUIT, BUCK APPARATUS, AND CIRCUIT CONTROL METHOD

(71) Applicant: Huawei Digital Power Technologies Co., Ltd., Shenzhen (CN)

(72) Inventor: Mi Zhao, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 244 days.

(21) Appl. No.: 18/063,527

(22) Filed: Dec. 8, 2022

(65) Prior Publication Data

US 2023/0106017 A1 Apr. 6, 2023

Related U.S. Application Data

(63) Continuation of application No. PCT/CN2020/095187, filed on Jun. 9, 2020.

(51) Int. Cl.
*H02M 3/158* (2006.01)
*H02M 1/00* (2007.01)
*H02M 1/32* (2007.01)

(52) U.S. Cl.
CPC ......... *H02M 3/158* (2013.01); *H02M 1/0009* (2021.05); *H02M 1/32* (2013.01)

(58) Field of Classification Search
CPC ....... H02M 1/0009; H02M 1/32; H02M 3/158
See application file for complete search history.

(56) References Cited

U.S. PATENT DOCUMENTS

| | | | |
|---|---|---|---|
| 6,407,899 B1 | 6/2002 | Carpenter | |
| 6,509,721 B1 | 1/2003 | Liebler | |
| 9,966,844 B2 | 5/2018 | Uno | |
| 10,277,111 B2 | 4/2019 | Chiereghin et al. | |
| 10,355,580 B2 | 7/2019 | Igarashi et al. | |
| 10,530,257 B1 | 1/2020 | Egan et al. | |
| 2006/0164055 A1* | 7/2006 | Hata | H02M 3/156 323/282 |
| 2017/0149333 A1 | 5/2017 | Uno | |

(Continued)

FOREIGN PATENT DOCUMENTS

| | | |
|---|---|---|
| CN | 1388618 A | 1/2003 |
| CN | 101080864 A | 11/2007 |

(Continued)

*Primary Examiner* — Jue Zhang
(74) *Attorney, Agent, or Firm* — SLATER MATSIL, LLP (57) ABSTRACT

The buck circuit includes a first switch component, a second switch component, a first freewheeling component, a second freewheeling component, an inductor, a first capacitor, and an over voltage protection OVP module. The first switch component and the first freewheeling component constitute a bridge arm. A first end of the inductor is connected to a midpoint of the bridge arm, and a second end of the inductor is connected to the second switch component. A first end of the second freewheeling component is connected to the second end of the inductor. A first end of the first capacitor is connected to the second switch component. The first capacitor is connected in parallel to the OVP module and a load of the buck circuit. The OVP module detects an output voltage of the buck circuit, and the output voltage of the buck circuit is an input voltage of the load.

20 Claims, 5 Drawing Sheets

(56) References Cited

U.S. PATENT DOCUMENTS

2019/0036451 A1    1/2019  Fox et al.
2019/0173372 A1*  6/2019  Lin ...................... H02M 1/143

FOREIGN PATENT DOCUMENTS

| CN | 203872056 U | 10/2014 |
|----|-------------|---------|
| CN | 104466914 A | 3/2015 |
| CN | 106489232 A | 3/2017 |
| CN | 107925353 A | 4/2018 |
| CN | 108933527 A | 12/2018 |
| CN | 109687712 A | 4/2019 |
| CN | 110492551 A | 11/2019 |
| CN | 111181370 A | 5/2020 |

* cited by examiner

BUCK CIRCUIT, BUCK APPARATUS, AND CIRCUIT CONTROL METHOD

CROSS-REFERENCE TO RELATED APPLICATIONS

This application is a continuation of International Application No. PCT/CN2020/095187, filed on Jun. 9, 2020, the disclosure of which is hereby incorporated by reference in its entirety.

TECHNICAL FIELD

This application relates to the field of circuit technologies, and in particular, to a buck circuit, a buck apparatus, and a circuit control method.

BACKGROUND

A buck circuit can reduce a relatively high input voltage to a relatively low voltage that meets a requirement of a rear-stage load and then output the relatively low voltage, and is widely used in various fields. The buck circuit includes a main control switch, a diode or a synchronous rectification switch, an inductor, and a capacitor. During operation, the main control switch is turned on based on a specific frequency and duty cycle, so that the buck circuit outputs a stable low voltage.

When the main control switch short-circuits, an input voltage is transmitted to an output port by using the short-circuited switch and the short-circuited inductor. A voltage at the output port is equal to the input voltage, and is higher than a value designed for the rear-stage load, which may damage the rear-stage load. For example, a rated voltage of a CPU of a consumer electronic device is 1.8 V. When a voltage of 3.3 V is directly accessed to the electronic device, the CPU may be burned due to an over voltage. For another example, when a voltage of 72 V is directly accessed to a device with a rated voltage of 48 V, an input over voltage, a component failure, and the like may be triggered.

Therefore, an over voltage protection measure is required to ensure circuit security.

SUMMARY

This application provides a buck circuit, a buck apparatus, and a circuit control method, to implement effective over voltage protection.

According to a first aspect, a buck circuit is provided, including: a first switch component, a second switch component, a first freewheeling component, a second freewheeling component, an inductor, a first capacitor, and an over voltage protection OVP module. The first switch component and the first freewheeling component constitute a bridge arm. A first end of the inductor is connected to a midpoint of the bridge arm, and a second end of the inductor is connected to the second switch component. A first end of the second freewheeling component is connected to the second end of the inductor. A first end of the first capacitor is connected to the second switch component. The first capacitor is connected in parallel to the OVP module and a load of the buck circuit. The OVP module is configured to detect an output voltage of the buck circuit, and the output voltage of the buck circuit is an input voltage of the load. When the output voltage is greater than a protection reference voltage, the OVP module controls the first switch component and the second switch component to be turned off.

In the foregoing technical solution, when the OVP module detects that the output voltage exceeds the protection reference voltage, the first switch component and the second switch component are turned off, to avoid the output voltage from continuing to rise. In addition, in the foregoing buck circuit, the first switch component and the second switch component are not directly connected in series. This reduces a possibility that the first switch component and the second switch component simultaneously fail due to an over current.

In a possible implementation, the first freewheeling component is a third switch component, and the circuit further includes an over current protection OCP module. The OCP module is connected to a second end of an input power supply, and the OCP module is configured to detect an input current. When the input current is greater than a protection reference current, the OCP module controls the first switch component, the second switch component, and the third switch component to be turned off.

When an over current occurs on an input side, a rise of a voltage lags behind a rise of a current on an output side due to existence of the capacitor. The OCP module is added on the input side, so that when it is detected that the over current occurs on the input side, a protection measure can be quickly made, to avoid an over voltage caused by the over current on the input side and a subsequent circuit security risk caused by the over current on the input side.

In another possible implementation, the first freewheeling component is a first diode.

When the first freewheeling component is the first diode, due to a cutoff effect of the first diode, a possibility that the bridge arm constituted by the first switch component and the first diode short-circuits may be relatively low. In this case, the OCP module may not be required, thereby simplifying the circuit.

In another possible implementation, the buck circuit further includes a fault confirmation module. A first end of the fault confirmation module is connected to the second end of the inductor, and a second end of the fault confirmation module is connected to a first end of the input power supply. The fault confirmation module is configured to determine whether the first switch component short-circuits.

In another possible implementation, when a difference between a voltage at the second end of the inductor and a voltage at the first end of the input power supply is greater than a first threshold, the fault confirmation module determines that the first switch component does not short-circuit; or when a difference between a voltage at the second end of the inductor and a voltage at the first end of the input power supply is less than or equal to a first threshold, the fault confirmation module determines that the first switch component short-circuits.

When the OVP module detects that the output voltage is greater than the protection reference voltage, and controls the first switch component and the second switch component to be turned off, or when the OCP module detects that the input current is greater than the protection reference current, and controls the first, second, and third switch components to be turned off, neither of the two modules can determine whether the buck circuit short-circuits or can be restored to operation. The fault confirmation module may be used to determine whether the first switch component of the buck circuit short-circuits, to determine whether the buck circuit can be restored to operation, thereby improving security of the buck circuit.

In another possible implementation, the second freewheeling component is a second capacitor, and a second end of the second capacitor is grounded; or the second freewheeling component is a second diode, and a second end of the second diode is connected to the first end of the input power supply.

In another possible implementation, the buck circuit further includes a third freewheeling component. When the second freewheeling component is the second capacitor, the third freewheeling component is a second diode; or when the second freewheeling component is the second diode, the third freewheeling component is a second capacitor.

According to a second aspect, a circuit control method is provided. The method includes: determining that an output voltage of a circuit is greater than a protection reference voltage, or determining that an input current of a circuit is greater than a protection reference current; and turning off a first switch component and a second switch component. The circuit includes the first switch component, the second switch component, a first freewheeling component, a second freewheeling component, an inductor, and a first capacitor. The first switch component and the first freewheeling component constitute a bridge arm. A first end of the inductor is connected to a midpoint of the bridge arm, and a second end of the inductor is connected to the second switch component. A first end of the second freewheeling component is connected to the second end of the inductor. A first end of the first capacitor is connected to the second switch component, and the first capacitor is connected in parallel to a load of the circuit. An output voltage of the circuit is an input voltage of the load, and an input current of the circuit is a current of a loop in which an input power supply of the circuit is located.

Over voltage detection and over current detection are combined. When the output voltage exceeds the protection reference voltage, the circuit implements over voltage protection, and the first switch and second switch components are turned off. When it is detected that a current on an input side rises but the output voltage does not exceed the protection reference voltage, the first switch and the second switch can still be turned off, to implement an effective protection measure and avoid an excessively high voltage on an output side. Circuit security is improved through combination of the two detection measures.

In a possible implementation, the method further includes: determining whether the first switch component short-circuits; and turning off the second switch component when determining that the first switch component short-circuits; or turning on the second switch component when determining that the first switch component does not short-circuit.

A circuit fault may be checked by determining whether the first switch component short-circuits. When it is determined that the first switch component does not short-circuit, the second switch component may be turned on after a voltage on the output side falls below the protection reference voltage, so that the circuit is restored to normal operation.

In another possible implementation, the determining whether the first switch component short-circuits includes: determining a difference between a first voltage and a voltage of the input power supply, where the first voltage is a voltage at the second end of the inductor; and when the difference between the first voltage and the voltage of the input power supply is greater than a first threshold, determining that the first switch component does not short-circuit; or when the difference between the first voltage and the voltage of the input power supply is less than or equal to a first threshold, determining that the first switch component short-circuits.

In another possible implementation, before the determining a difference between a first voltage and a voltage of the input power supply, the method further includes: determining a sampling voltage of the first voltage, and determining the first voltage based on the sampling voltage of the first voltage.

In another possible implementation, the determining that an output voltage of a circuit is greater than a protection reference voltage includes: determining that the output voltage is greater than a second threshold, and determining that the output voltage of the circuit is greater than the protection reference voltage; or determining that a sampling voltage of the output voltage is greater than a third threshold, and determining that the output voltage of the circuit is greater than the protection reference voltage.

In another possible implementation, the determining that an input current of the circuit is greater than a protection reference current includes: determining that a second voltage corresponding to the input current is greater than a fourth threshold, and determining that the input current of the circuit is greater than the protection reference current.

In the foregoing solution, a plurality of manners may be used to determine that the output voltage is greater than the protection reference voltage and the input current is greater than the protection reference current, thereby improving flexibility of a circuit control method.

According to a third aspect, a buck apparatus is provided, where the buck apparatus includes the buck circuit in the first aspect and any one of the possible implementations in the first aspect.

DETAILED DESCRIPTION OF ILLUSTRATIVE EMBODIMENTS

The following describes technical solutions in embodiments of this application with reference to the accompanying drawings in embodiments of this application. It can be understood that the described embodiments are some rather than all embodiments of this application.

In the energy conversion field, a relatively high input voltage usually needs to be converted into a relatively low output voltage. For example, in a power supply circuit of a mainboard of a computer, an input voltage of 12 V needs to be reduced to 3.3 V, or an input voltage of 3.3 V needs to be reduced to 1.8 V. For example, in a secondary power supply of a communications system, a bus voltage of 48 V needs to be reduced to a voltage value required by a load. For example, a lithium electricity conversion board needs to convert a lithium battery greater than 57 V into a voltage of 48 V or the like required by the communications system.

A buck circuit can reduce a relatively high input voltage to a relatively low voltage that meets a requirement of a rear-stage load and then output the relatively low voltage, and is widely used in the foregoing energy conversion scenario. In the buck circuit, when a main control switch of the buck circuit is faulty and fails due to a short circuit, a high input voltage is accessed to output by using an inductor. This causes an output over voltage, which damages a rear-stage device using power and endangers circuit security. Therefore, an over voltage protection measure is required to ensure security of the buck circuit when the main control switch fails.

Figure 1:
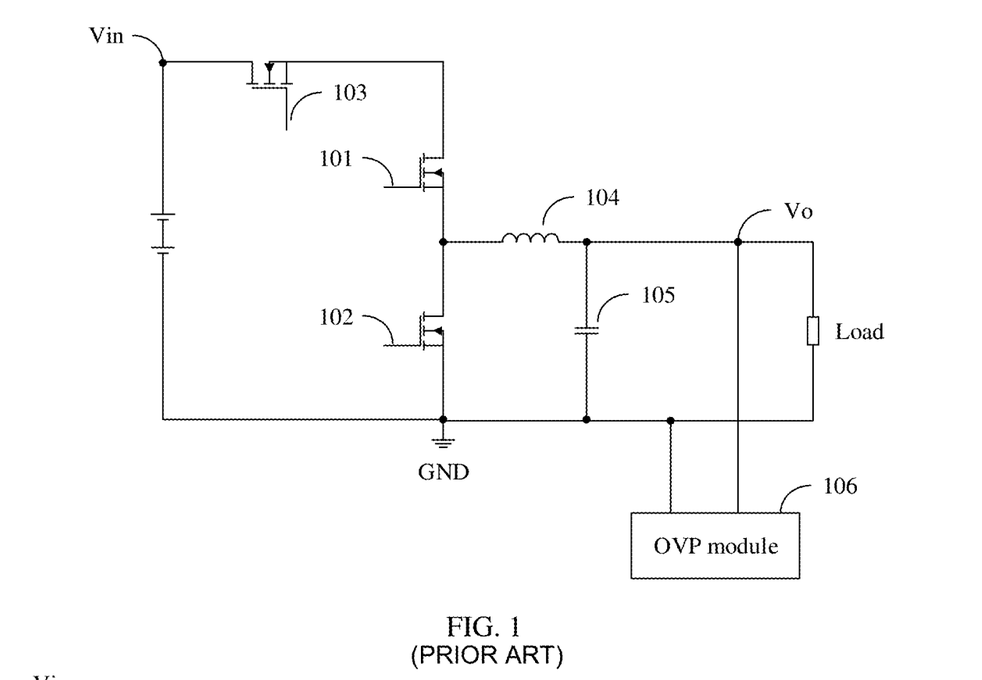
FIG. 1 is a schematic diagram of an existing over voltage protection solution of a buck circuit.

FIG. 1 is a schematic diagram of an existing buck circuit protection solution. As shown in FIG. 1, a buck circuit includes a switch component 101, a switch component 102, a switch component 103, an inductor 104, a capacitor 105, and an over voltage protect (OVP) module 106. The switch component 101 is a main control switch. The switch component 102 is a freewheeling switch. The switch component 101 is turned on based on a proper frequency and duty cycle, so that a load obtains a relatively stable low voltage Vo lower than an input voltage Vin. To avoid that Vo is excessively high when the main control switch fails, in the existing solution, the OVP module 106 is connected in parallel to the load, and the switch component 103 is connected in series to the switch component 101. The switch component 103 is used as a standby switch. When the main control switch fails, the OVP module detects that the output voltage Vo rises to an over voltage protection point, and the switch component 103 used as the standby switch is turned off to block an input voltage from being transferred to output.

However, when the main control switch 101 fails due to an over current, a relatively large current also flows through the standby switch 103. Therefore, the main control switch component 101 and the standby switch component 103 may simultaneously fail. Over voltage protection cannot be implemented after the main control switch component 101 and the standby switch component 103 simultaneously fail. In addition, when the freewheeling switch component 102 is a synchronous rectification switch, and the switch component 101 short-circuits and the switch component 102 is turned on, a relatively large short-circuit current flows through a loop of a bridge arm constituted by the switch component 101 and the switch component 102, further inducing a subsequent fault. For example, an input bus is pulled down due to an over current, the switch component 102 further fails due to an over current and a short circuit. After the switch component 102 fails, the input bus short-circuits, so that another device on a same bus is powered off. For another example, the switching component 102 fails due to an over current and an open circuit. As a result, the input voltage is directly transmitted to the output, which causes an output over voltage.

According to the buck circuit provided in this embodiment of this application, effective over voltage protection of the buck circuit can be implemented, thereby enhancing circuit security.

A buck circuit in embodiments of this application is described below in detail with reference to FIG. 2 to FIG. 5.

Figure 2:
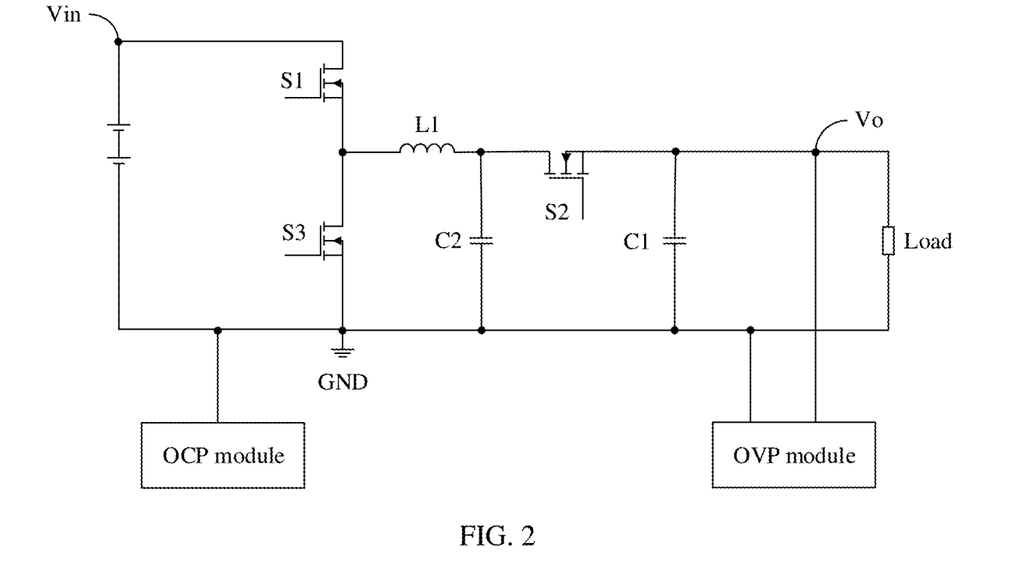
FIG. 2 is a schematic diagram of a buck circuit according to an embodiment of this application.

FIG. 2 is a schematic diagram of a buck circuit according to an embodiment of this application. As shown in FIG. 2, the buck circuit includes a first switch component, a second switch component, a first freewheeling component, a second freewheeling component, an inductor, a first capacitor, and an OVP module. For example, in some embodiments, as shown in FIG. 2, the first switch component is S1, the second switch component is S2, the inductor is L1, and the first capacitor is C1.

In some embodiments, as shown in FIG. 2, the first freewheeling component is a third switch component S3, and the second freewheeling component is a second capacitor C2. S1 and S3 constitute a switch bridge arm. A first end of the inductor L1 is connected to a midpoint of the switch bridge arm, and a second end of the inductor L1 is connected to a positive end of the capacitor C1 and the second switch component S2. A second end of S2 is connected to the capacitor C2, and the capacitor C2 is connected in parallel to the OVP module and a load of the buck circuit.

It should be understood that, in some embodiments, when S1 is used as a main control switch and S3 is used as a freewheeling switch, the circuit shown in FIG. 2 may implement a function of the buck circuit. When S1 is used as a freewheeling switch and S3 is used as a main control switch, the circuit shown in FIG. 2 may implement a function of the buck circuit. The buck circuit in this embodiment of this application is described below in detail by using an example in which S1 is used as a main control switch.

In some embodiments, S1, S2, and S2 may be specifically insulated gate bipolar switch components (IGBT), or both S1 and S2 are metal-oxide-semiconductor field-effect transistors (MOSFET). It should be understood that the switch component in this embodiment of this application may alternatively be another possible switch component. This is not limited in this embodiment of this application.

In the buck circuit shown in FIG. 2, the OVP module is configured to detect an output voltage Vo. When Vo is greater than a protection reference voltage, the OVP module controls S1, S2, and S3 to be turned off, so as to prevent an output over voltage.

In the foregoing solution, the main control switch S1 and the standby switch S2 are not directly connected in series in a same loop. This reduces a possibility that the main control switch and the standby switch simultaneously fail due to an over current, and ensures circuit security.

In some embodiments, as shown in FIG. 2, the circuit may further include an over current protect (OCP) module. The OCP module is configured to detect a current on an input side. When the current on the output side is greater than a protection reference current, the OCP module controls S1, S2, and S3 to be turned off, so as to prevent a failure of the switch bridge arm due to a short circuit and a chain reaction after the failure.

In addition, when the main control switch short-circuits, a difference between an input voltage Vin and the output voltage Vo is relatively large. Due to a filter effect of the capacitors C1 and C2, a rise of the output voltage lags behind a rise of a current. Compared with that the OVP module on the output side detects an over voltage of Vo, the OCP module on the input side may more quickly detect an over current, and quickly make a protection measure of turning off S1 to S3.

When the difference between the input voltage Vin and the output voltage Vo is relatively small, or the main control switch fails and displays specific impedance, the current on the input side is relatively small, and may not exceed the protection reference current. Therefore, over voltage protection cannot be effectively performed. In this case, the OVP module on the output side may detect whether Vo is greater than the protection reference voltage, thereby implementing over voltage protection.

A combination of the OCP module and the OVP module can effectively control a transient over-shoot value of the output voltage and effectively protect a situation of bridge arm shoot-through, thereby ensuring circuit security.

In some embodiments, when the circuit implements a function of the buck circuit, the first freewheeling component may be a diode. As shown in (a) in FIG. 3, the first freewheeling component of the buck circuit may be a first diode D1.

Figure 3:
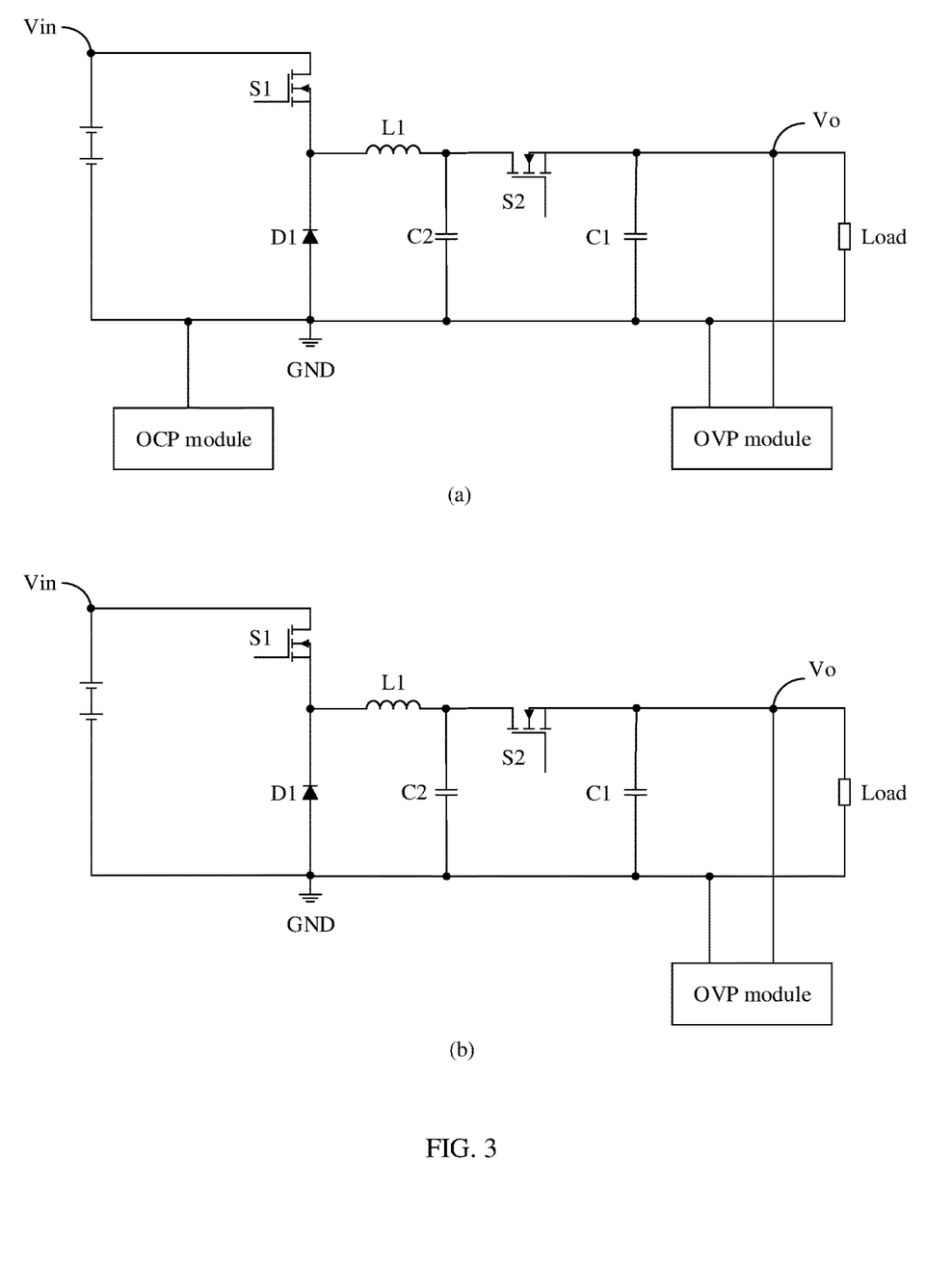
FIG. 3 is a schematic diagram of another buck circuit according to an embodiment of this application.

In the buck circuit shown in FIG. 3, a function of another component is the same as that of a corresponding component in the buck circuit shown in FIG. 2. Details are not described herein again. It should be understood that in the buck circuit shown in (a) in FIG. 3, due to cutoff of the diode, a probability that the bridge arm S1-D1 short-circuits is relatively small. Therefore, when the diode is used as the first freewheeling component of the buck circuit, the OCP module may not be required. A buck circuit in which the diode is used as the first freewheeling component and the OCP module is not required is shown in (b) in FIG. 3.

In the foregoing solution, when the OCP module detects that an over current occurs on the input side, or the OVP module detects that an over voltage occurs on the output side, S1 to S3 are all turned off. In this case, it cannot be known whether a short-circuit fault occurs on the main control switch S1. When a short-circuit fault occurs on the main control switch S1, the circuit cannot be restored to operation. When a short-circuit fault does not occur on the main control switch, the circuit can be restored to operation. Therefore, in some embodiments, a fault confirmation module may be added to the circuit to determine whether a short-circuit fault occurs on the main control switch S1. A buck circuit that can perform fault confirmation is described below by using an example in which a fault confirmation module is added to the buck circuit shown in FIG. 2.

Figure 4:
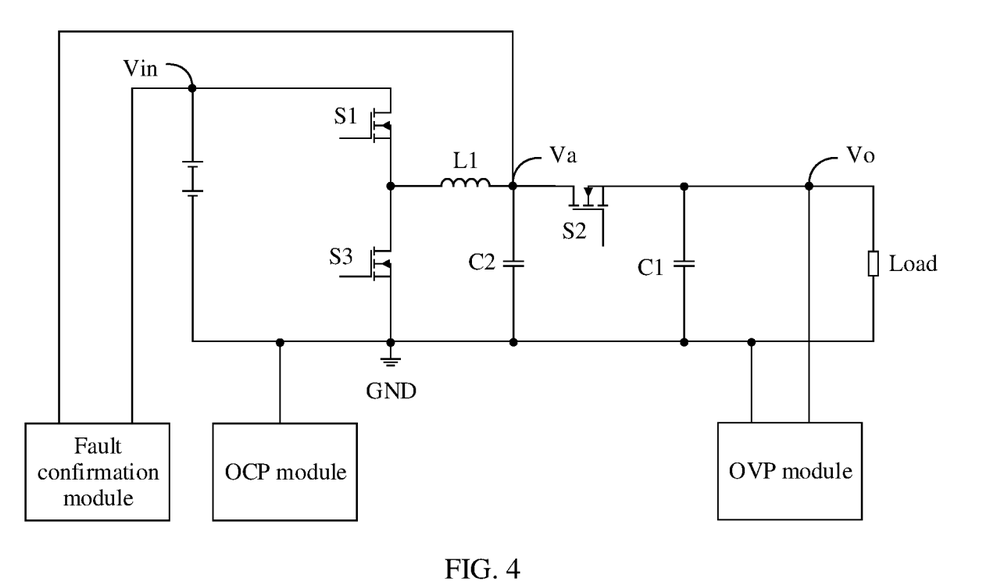
FIG. 4 is a schematic diagram of another buck circuit according to an embodiment of this application.

As shown in FIG. 4, a fault confirmation module is added to the buck circuit shown in FIG. 2. A first end of the fault confirmation module is connected to a second end of the inductor L1, to measure a voltage Va. The first end of the fault confirmation module is connected to a first end of an input power supply, to measure a voltage Vin. When the voltage Va is close to the input voltage Vin, it is considered that the main control switch S1 short-circuits, and the circuit cannot be restored to operation. For example, in some embodiments, when a voltage difference between Va and Vin is less than or equal to a specific threshold (for example, a first threshold), it is considered that S1 short-circuits, and the circuit cannot be restored to operation.

In some other embodiments, when the voltage Va is lower than the input voltage Vin and a difference is relatively large, it is considered that S1 does not short-circuit. For example, when a voltage difference between Va and Vin is greater than a specific threshold (for example, a first threshold), it is considered that S1 does not short-circuit, and after the output voltage Vo falls below the protection reference voltage, the circuit may be restored to operation. When the circuit is restored to operation, the standby switch S2 is turned on, and the main control switch S1 is turned off or turned on based on a specific frequency and duty cycle. The freewheeling switch S3 is turned on when the main control switch S1 is turned off, and is turned off when the main control switch S1 is turned on.

It should be understood that FIG. 4 shows only a schematic diagram of a buck circuit in which a fault confirmation module is added to the buck circuit shown in FIG. 2. In the buck circuit shown in FIG. 3, a fault confirmation module may be added in a manner shown in FIG. 4. A connection manner and a function of the fault confirmation module are the same as those in the foregoing solution, and details are not described herein again.

In the buck circuits shown in FIG. 2 to FIG. 4, the second freewheeling component and the capacitor C1, may provide a freewheeling path for the inductor L1. In some embodiments, the second freewheeling component may be a diode. As shown in (a) in FIG. 5, the second freewheeling component is a second diode D2. A first end of the diode D2 is connected to the second end of the inductor L1, and a second end of the diode D2 is connected to the first end of the input power supply.

Figure 5:
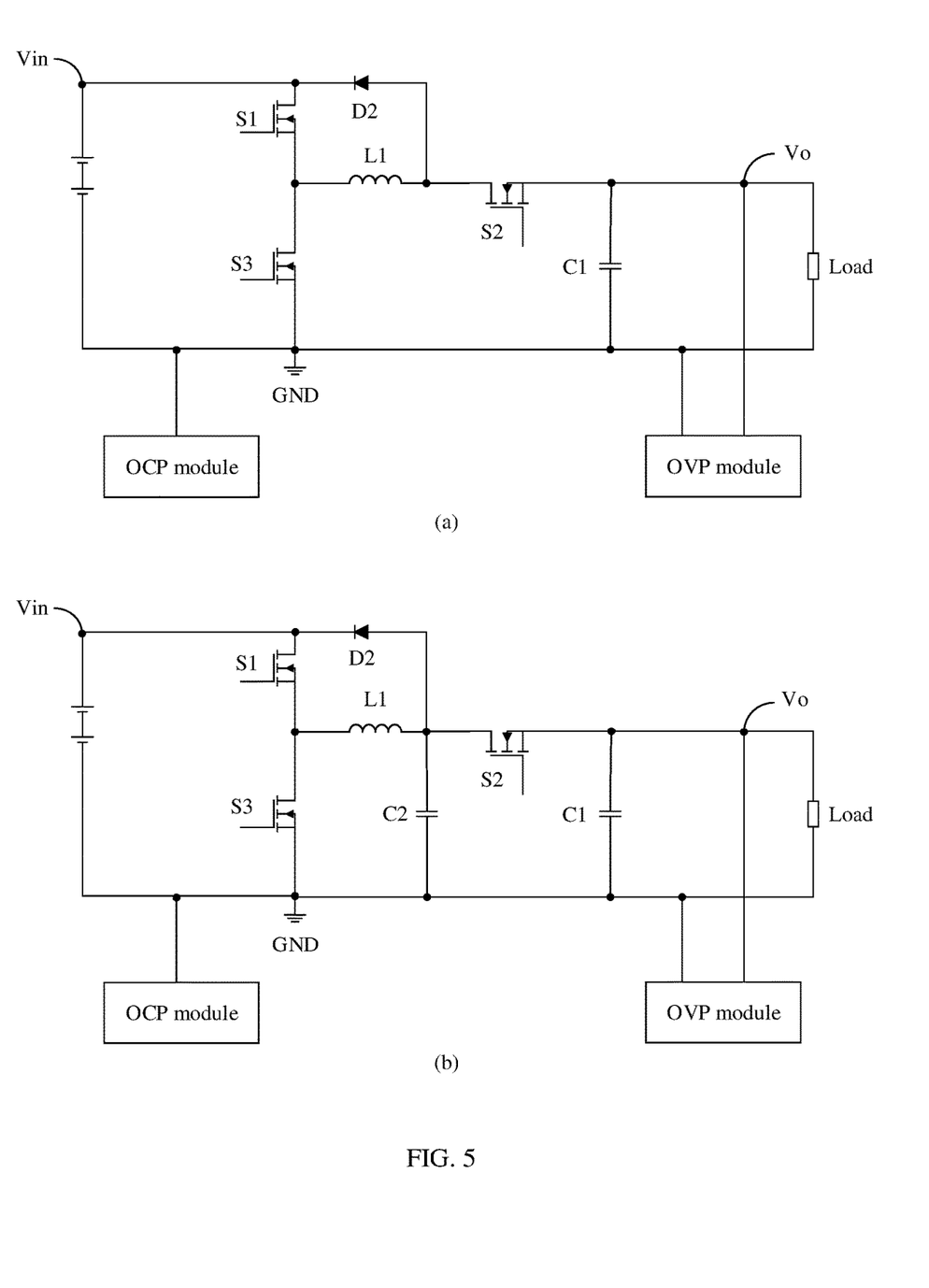
FIG. 5 is a schematic diagram of another buck circuit according to an embodiment of this application.

Both the diode D2 and the capacitor C2 may provide a freewheeling path for the inductor L1. Therefore, in some embodiments, the buck circuit in this embodiment of this application may further include a third freewheeling component.

For example, as shown in FIG. 2 to FIG. 4, when the second freewheeling component is the second capacitor C2, the third freewheeling component is the second diode D2. A connection manner of the diode D2 is shown in (a) in FIG. 5, and a buck circuit including the third freewheeling component is shown in (b) in FIG. 5.

For example, as shown in (a) in FIG. 5, when the second freewheeling component is the second diode D2, the third freewheeling component may be the second capacitor C2. A connection manner of the capacitor C2 is shown in FIG. 2 to FIG. 4, and a buck circuit including the third freewheeling component is shown in (b) in FIG. 5.

It should be understood that FIG. 5 shows only a schematic diagram of a buck circuit in which a second freewheeling component is changed on or a third freewheeling component is added to the buck circuit shown in FIG. 2. In the buck circuits shown in FIG. 3 and FIG. 4, a second freewheeling component may be changed or a third freewheeling component may be added in a manner shown in FIG. 5. Connection manners and functions of the second freewheeling component and the third freewheeling component are the same as those in the foregoing solution, and details are not described herein again.

Figure 6:
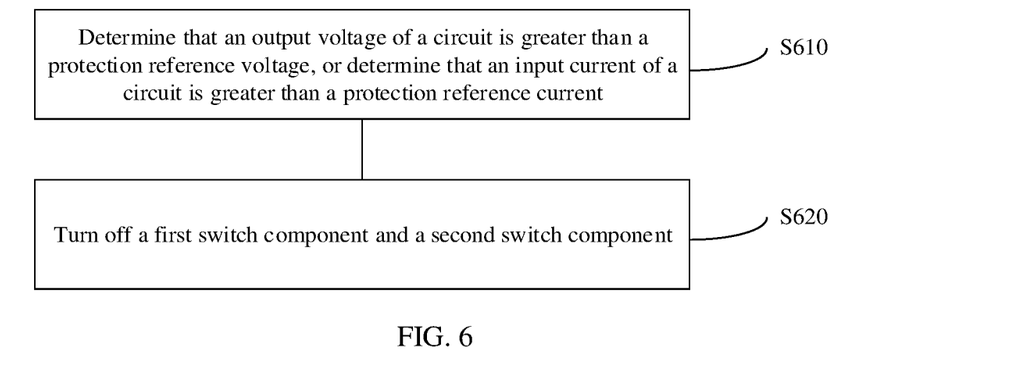
FIG. 6 is a schematic flowchart of a circuit control method according to an embodiment of this application.
Figure 7:
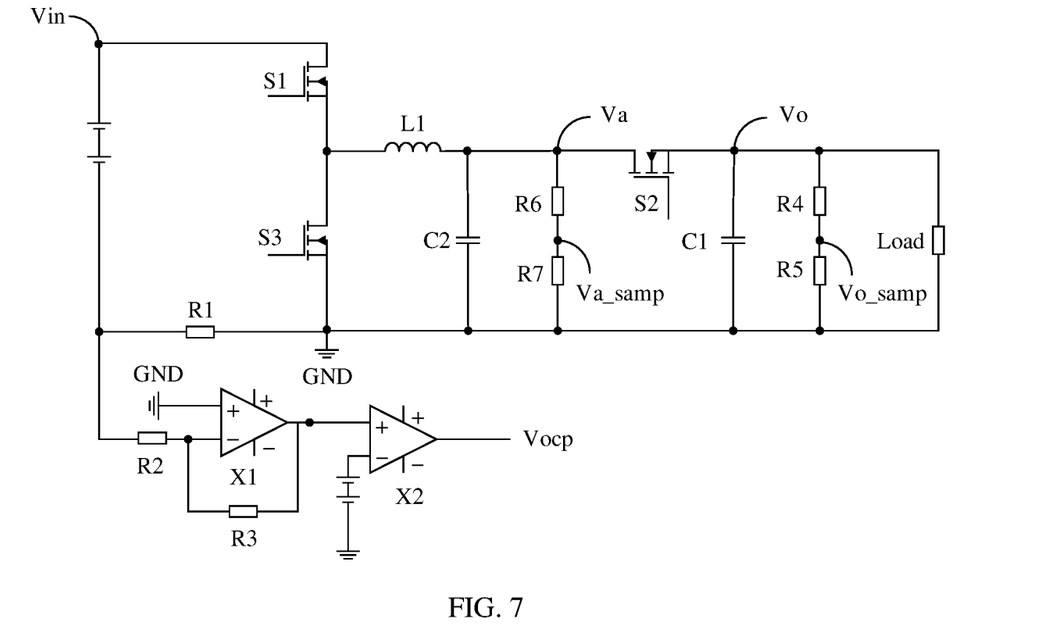
FIG. 7 is a schematic diagram of a circuit corresponding to a circuit control method according to an embodiment of this application.

An embodiment of this application further includes a circuit control method. FIG. 6 is a schematic flowchart of a circuit control method according to an embodiment of this application. FIG. 7 is a diagram of a circuit for implementing a circuit control method according to an embodiment of this application. The circuit control method in this embodiment of this application is described below in detail with reference to FIG. 6 and FIG. 7.

As shown in FIG. 6, the circuit control method in this embodiment of this application includes step S610 to step S620.

S610: Determine that an output voltage of a circuit is greater than a protection reference voltage, or determine that an input current of a circuit is greater than a protection reference current.

FIG. 7 is a diagram of a circuit for a circuit control method according to an embodiment of this application. It should be understood that FIG. 7 shows only a possible form of a circuit, and the circuit may further be any one of the buck circuits shown in FIG. 2 to FIG. 5. The OCP module may include R1 to R3 and operational amplifiers X1 and X2 shown in FIG. 7. The OVP module may include R4 and R5 shown in FIG. 7.

For example, to determine that the output voltage of the circuit is greater than the protection reference voltage, the output voltage Vo of the circuit may be measured, where Vo is voltages of the first capacitor C1 and the load. When Vo is greater than a second threshold, it may be determined that the output voltage is greater than the protection reference voltage.

For example, to determine that the output voltage of the circuit is greater than the protection reference voltage, the output voltage Vo may be further sampled, and it is determined, based on sampling Vo_samp of the output voltage, whether the output voltage is greater than the protection reference voltage. When Vo_samp is greater than a third threshold, it may be determined that the output voltage is greater than the protection reference voltage.

In some embodiments, the output voltage may be sampled through voltage division. As shown in FIG. 7, the resistors R4 and R5 are connected in series and then are connected in parallel to the load. A voltage at a midpoint between R4 and $R_5$ is measured, that is, sampling Vo_samp of the output voltage is measured. It should be understood that sampling of the output voltage Vo may be sampling in another form. This is not limited in this embodiment of this application.

For example, to determine that the input current of the circuit is greater than the protection reference current, the input current may be sampled, and measurement of the input current is converted into measurement of a voltage.

In some embodiments, as shown in FIG. 7, the input current is converted into a corresponding second voltage Vocp by using R1 to R3 and the operational amplifiers X1 and X2. When it is determined that Vocp is greater than a fourth threshold, it may be determined that the input current is greater than the protection reference current. It should be understood that the input current may be detected and converted in another form. This is not limited in this embodiment of this application.

In the foregoing solution, sampling of the input current or the output voltage enables measurement to be more accurate.

S620: Turn off a first switch component and a second switch component.

When it is determined that the output voltage of the circuit is greater than the protection reference voltage or the input current is greater than the protection reference current, the first switch component and the second switch component are turned off.

Through combination of over current protection and over voltage protection are combined, if any one of the input current and the output voltage exceeds a protection reference value, a protection measure takes effect, and the first switch component and the second switch component are turned off, thereby ensuring circuit security. In addition, in this embodiment of this application, the first switch component and the second switch component are located in different circuit loops. Therefore, the two switch components do not simultaneously fail due to a single fault, thereby further ensuring circuit security.

In some other embodiments, the foregoing circuit control method may further include step S630.

S630: Determine whether the first switch component short-circuits.

When it is determined that the first switch component short-circuits, the second switch component is turned off. When it is determined that the first switch component short-circuits, because the first switch component is a main control switch of the circuit, the main control switch is faulty, the circuit cannot be restored to normal operation, and the second switch component remains off.

When it is determined that the first switch component does not short-circuit, the second switch component may be turned on after the output voltage falls below the protection reference voltage, so that the circuit is restored to operation.

When the circuit is restored to operation, the first switch component is turned on or turned off based on a specified duty cycle, to implement a function of the buck circuit.

For example, it may be determined, based on a first voltage Va, whether the first switch component short-circuits. As shown in FIG. 7, the first voltage Va is a voltage at the second end of the inductor L1. When a difference between Va and the input voltage Vin is greater than the first threshold, it may be determined that the first switch component does not short-circuit. When the difference between Va and Vin is less than or equal to the first threshold, it may be determined that the first switch component short-circuits.

In some other embodiments, the first voltage may be determined based on a sampling voltage of the first voltage Va. For example, as shown in FIG. 7, R6 and R7 are connected in series and then are connected in parallel to C2. A voltage at a midpoint between R6 and R7 is measured, that is, a sampling voltage Va_samp of Va is measured. In this case, Va and Va_samp have the following relationship:

$$V_a = \frac{R_6 + R_7}{R_7} \times V_{a\_samp}$$

The first voltage Va may be determined based on the sampling voltage Va_samp, and then, with reference to the foregoing method in which whether the first switch component short-circuits is determined based on values of Va and Vin, it may be determined whether the first switch component short-circuits.

It should be understood that sampling of the first voltage Va may be sampling in another form. This is not limited in this embodiment of this application.

In the foregoing method, detection of Vo, Vo_samp, Va, Va_samp, and Vocp may be performed by a controller, and an operation of turning on or turning off the first switch component and the second switch component may also be performed by the controller. For example, the controller may be a controller such as a digital signal processor (DSP), a single-chip microcomputer, or an advanced reduced instruction set processor (ARM).

Through detection of Va or Va_samp, a cause of a fault of the circuit may be further determined. Particularly, when the circuit is started or the circuit stops working due to an over voltage, Va or Va_samp may be used to determine whether the first switch component short-circuits, thereby enhancing circuit security.

An embodiment of this application further includes a buck apparatus, and the buck apparatus includes the buck circuit in embodiments of this application. The buck apparatus may be specifically a buck-type direct current-direct current (DC-DC) conversion apparatus. The buck apparatus may be equipped in various electronic devices that require buck conversion. For example, the buck apparatus may be equipped on a computer mainboard, to reduce an input voltage of 12 V to 3.3 V to supply power to the computer mainboard. For another example, the buck apparatus may be equipped on an electric energy conversion board of a communications system, to reduce an input voltage exceeding 57 V to a voltage of 48 V required by the communications system.

It should be understood that "some embodiments" or "an embodiment" mentioned in the entire specification means that particular features, structures, or characteristics related to the embodiment are included in at least one embodiment of this application. Therefore, "in some embodiment" or "in an embodiment" appearing throughout the specification does not refer to a same embodiment. In addition, these particular features, structures, or characteristics may be combined in one or more embodiments in any appropriate manner. It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, method steps may be implemented by electronic hardware, computer software, or a combination thereof. To clearly describe the interchangeability between the hardware and the software, the foregoing has generally described steps of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

In the several embodiments provided in this application, it should be understood that the disclosed apparatuses and methods may be implemented in other manners. For example, the described apparatus embodiment is merely an example. For example, division into the modules is merely logical function division and may be other division in actual implementation. For example, a plurality of modules or components may be combined or integrated into another system, or some features may be ignored or not performed.

In addition, functional modules in embodiments of this application may be integrated into one processing unit, or each of the modules may exist alone physically, or two or more modules are integrated into one module.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A buck circuit, comprising:
   a first switch component;
   a second switch component;
   a first freewheeling component, wherein the first switch component and the first freewheeling component constitute a bridge arm;
   a second freewheeling component;
   an inductor, wherein a first end of the inductor is connected to a midpoint of the bridge arm, and a second end of the inductor is connected to the second switch component, and a first end of the second freewheeling component is connected to the second end of the inductor;
   a first capacitor, wherein a first end of the first capacitor is connected to the second switch component, and the first capacitor is connected in parallel to an over voltage protection (OVP) module and a load of the buck circuit; and
   the OVP module, wherein the OVP module is configured to detect an output voltage of the buck circuit, the output voltage of the buck circuit is an input voltage of the load, and the OVP module controls the first switch component and the second switch component to be turned off based on the output voltage being greater than a protection reference voltage.

2. The buck circuit according to claim 1, wherein the first freewheeling component is a third switch component, and the circuit further comprises an over current protection (OCP) module connected to a second end of an input power supply;
   wherein the OCP module is configured to detect an input current; and
   wherein the OCP module controls the first switch component, the second switch component, and the third switch component to be turned off based on the input current being greater than a protection reference current.

3. The buck circuit according to claim 1, wherein the first freewheeling component is a first diode.

4. The buck circuit according to claim 1, wherein the buck circuit further comprises a fault confirmation module, a first end of the fault confirmation module is connected to the second end of the inductor, and a second end of the fault confirmation module is connected to a first end of an input power supply; and
   wherein the fault confirmation module is configured to determine whether the first switch component short-circuits.

5. The buck circuit according to claim 2, wherein the buck circuit further comprises a fault confirmation module, a first end of the fault confirmation module is connected to the second end of the inductor, and a second end of the fault confirmation module is connected to a first end of the input power supply; and
   wherein the fault confirmation module is configured to determine whether the first switch component short-circuits.

6. The buck circuit according to claim 3, wherein the buck circuit further comprises a fault confirmation module, a first end of the fault confirmation module is connected to the second end of the inductor, and a second end of the fault confirmation module is connected to a first end of an input power supply; and
   wherein the fault confirmation module is configured to determine whether the first switch component short-circuits.

7. The buck circuit according to claim 1, wherein:
   the second freewheeling component is a second capacitor, and a second end of the second capacitor is grounded; or
   the second freewheeling component is a second diode, and a second end of the second diode is connected to a first end of an input power supply.

8. The buck circuit according to claim 7, wherein the circuit further comprises a third freewheeling component, wherein:
   the third freewheeling component is the second diode based on the second freewheeling component being the second capacitor; or
   the third freewheeling component is the second capacitor based on the second freewheeling component being the second diode.

9. A circuit control method, comprising:
   determining an output voltage of a circuit is greater than a protection reference voltage, or determining that an input current of a circuit is greater than a protection reference current; and turning off a first switch component and a second switch component;
wherein the circuit comprises:
the first switch component;
the second switch component;
a first freewheeling component, wherein the first switch component and the first freewheeling component constitute a bridge arm;
a second freewheeling component;
an inductor, wherein a first end of the inductor is connected to a midpoint of the bridge arm, and a second end of the inductor is connected to the second switch component and a first end of the second freewheeling component; and
a first capacitor, wherein a first end of the first capacitor is connected to the second switch component, and the first capacitor is connected in parallel to a load of the circuit,
wherein the output voltage of the circuit is an input voltage of the load, and the input current of the circuit is a current of a loop in which an input power supply of the circuit is located.

10. The method according to claim 9, wherein the method further comprises:
determining whether the first switch component short-circuits;
turning off the second switch component based on determining that the first switch component short-circuits; and
turning on the second switch component based on determining that the first switch component does not short-circuit.

11. The method according to claim 10, wherein the determining whether the first switch component short-circuits comprises:
determining a difference between a first voltage and a voltage of the input power supply, wherein the first voltage is a voltage at the second end of the inductor; and
determining, based on the difference between the first voltage and the voltage of the input power supply being greater than a first threshold, that the first switch component is not short-circuited; and
determining, based on the difference between the first voltage and the voltage of the input power supply being less than or equal to a first threshold, that the first switch component is short-circuited.

12. The method according to claim 11, wherein the method further comprises, before the determining the difference between the first voltage and the voltage of the input power supply:
determining a sampling voltage of the first voltage; and
determining the first voltage based on the sampling voltage of the first voltage.

13. The method according to claim 9, wherein the determining that the output voltage of the circuit is greater than the protection reference voltage comprises at least one of:
performing:
determining that the output voltage is greater than a second threshold; and
determining that the output voltage of the circuit is greater than the protection reference voltage; or
performing:
determining that a sampling voltage of the output voltage is greater than a third threshold; and
determining that the output voltage of the circuit is greater than the protection reference voltage.

14. The method according to claim 9, wherein the determining that the input current of the circuit is greater than the protection reference current comprises:
determining that a second voltage corresponding to the input current is greater than a fourth threshold; and
determining that the input current of the circuit is greater than the protection reference current.

15. A buck apparatus, comprising:
a buck circuit, comprising:
a first switch component;
a second switch component;
a first freewheeling component, wherein the first switch component and the first freewheeling component constitute a bridge arm;
a second freewheeling component;
an inductor, wherein a first end of the inductor is connected to a midpoint of the bridge arm, and a second end of the inductor is connected to the second switch component, wherein a first end of the second freewheeling component is connected to the second end of the inductor; and
a first capacitor, wherein a first end of the first capacitor is connected to the second switch component, and the first capacitor is connected in parallel to an over voltage protection (OVP) module and a load of the buck circuit; and
the OVP module, configured to detect an output voltage of the buck circuit,
wherein the output voltage of the buck circuit is an input voltage of the load, and wherein the OVP module controls the first switch component and the second switch component to be turned off based on the output voltage being greater than a protection reference voltage.

16. The buck circuit according to claim 15, wherein the first freewheeling component is a third switch component, and the circuit further comprises an over current protection OCP module; and
wherein the OCP module is connected to a second end of an input power supply, and the OCP module is configured to detect an input current, and wherein, based on the input current being greater than a protection reference current, the OCP module controls the first switch component, the second switch component, and the third switch component to be turned off.

17. The buck circuit according to claim 15, wherein the first freewheeling component is a first diode.

18. The buck circuit according to claim 15, wherein the circuit comprises a fault confirmation module, wherein a first end of the fault confirmation module is connected to the second end of the inductor, and a second end of the fault confirmation module is connected to a first end of an input power supply; and
wherein the fault confirmation module is configured to determine whether the first switch component short-circuits.

19. The buck apparatus according to claim 15, wherein:
the second freewheeling component is a second capacitor, and a second end of the second capacitor is grounded; or
the second freewheeling component is a second diode, and a second end of the second diode is connected to a first end of an input power supply.

20. The buck apparatus according to claim 19, wherein the circuit further comprises a third freewheeling component, wherein:

the third freewheeling component is the second diode based on the second freewheeling component being the second capacitor; or the third freewheeling component is the second capacitor based on the second freewheeling component being the second diode.

\* \* \* \* \*